(12) United States Patent
Atkey et al.

(10) Patent No.: US 8,973,393 B2
(45) Date of Patent: Mar. 10, 2015

(54) SYSTEM AND METHOD FOR IMPROVED COOLING EFFICIENCY OF AN AIRCRAFT DURING BOTH GROUND AND FLIGHT OPERATION

(75) Inventors: Warren A. Atkey, Bothell, WA (US); Steve G. Mackin, Bellevue, WA (US); Rod Millar, Everett, WA (US)

(73) Assignee: The Boeing Company, Chicago, IL (US)

( * ) Notice: Subject to any disclaimer, the term of this patent is extended or adjusted under 35 U.S.C. 154(b) by 1222 days.

(21) Appl. No.: 12/614,441

(22) Filed: Nov. 8, 2009

(65) Prior Publication Data
US 2011/0107777 A1    May 12, 2011

(51) Int. Cl.
F25D 9/00 (2006.01)
B60H 1/32 (2006.01)
F25B 1/00 (2006.01)
B64D 13/06 (2006.01)

(52) U.S. Cl.
CPC ........ *B64D 13/06* (2013.01); *B64D 2013/0644* (2013.01); *B64D 2013/0688* (2013.01); *Y02T 50/44* (2013.01); *Y02T 50/56* (2013.01); *Y10S 62/05* (2013.01)
USPC .............. 62/401; 62/115; 62/244; 62/DIG. 5; 62/402

(58) Field of Classification Search
CPC ................................ Y02T 50/56; B64D 13/06
USPC ............. 62/244, 401, 402, DIG. 5; 244/118.5
See application file for complete search history.

(56) References Cited

U.S. PATENT DOCUMENTS

| | | | |
|---|---|---|---|
| 2,800,002 A | * | 7/1957 | Seed ................................ 62/402 |
| 4,015,438 A | * | 4/1977 | Kinsell et al. ..................... 62/88 |
| 4,262,495 A | | 4/1981 | Gupta et al. |
| 4,487,034 A | * | 12/1984 | Cronin et al. ................... 62/402 |
| 4,503,666 A | * | 3/1985 | Christoff ......................... 60/785 |
| 4,684,081 A | * | 8/1987 | Cronin ............................ 244/58 |
| 5,036,678 A | | 8/1991 | Renninger et al. |

(Continued)

FOREIGN PATENT DOCUMENTS

| | | |
|---|---|---|
| DE | 102006042584 A1 | 3/2008 |
| WO | 99/20528 A1 | 4/1999 |

(Continued)

OTHER PUBLICATIONS

14 C.F.R. Section 25.831(a), Chapter 1 (Jan. 1, 2009 Edition).

(Continued)

*Primary Examiner* — Allen Flanigan
*Assistant Examiner* — Filip Zec

(57) ABSTRACT

An aircraft system for improved cooling efficiency comprises at least one air conditioning pack, coupled to an aircraft, having at least one air compression device powered by at least one power source and having an air compression device inlet. The system further comprises at least one air flow path for redirecting a first portion of a first volume of aircraft interior outflow air from an aircraft interior to the air compression device inlet. The air flow path includes a shutoff valve to enable the air flow path during ground operation of the aircraft and to disable the air flow path for flight operation of the aircraft. The air compression inlet mixes the first volume of aircraft interior outflow air with a second volume of aircraft exterior inflow air to form an air mixture. The air conditioning pack conditions and circulates the air mixture into the aircraft interior.

22 Claims, 3 Drawing Sheets

(56) References Cited

U.S. PATENT DOCUMENTS

| | | | |
|---|---|---|---|
| 6,401,473 B1* | 6/2002 | Ng et al. | 62/239 |
| 6,491,254 B1* | 12/2002 | Walkinshaw et al. | 244/118.5 |
| 6,526,775 B1 | 3/2003 | Asfia et al. | |
| 6,629,428 B1 | 10/2003 | Murry | |
| 6,681,592 B1 | 1/2004 | Lents et al. | |
| 7,207,521 B2 | 4/2007 | Atkey et al. | |
| 7,467,524 B2* | 12/2008 | Brutscher et al. | 62/402 |
| 7,871,038 B2* | 1/2011 | Space et al. | 244/118.5 |
| 2001/0032472 A1* | 10/2001 | Buchholz et al. | 62/172 |
| 2003/0005718 A1* | 1/2003 | Mitani et al. | 62/402 |
| 2003/0051492 A1* | 3/2003 | Hartenstein et al. | 62/172 |
| 2003/0177781 A1* | 9/2003 | Haas et al. | 62/402 |
| 2004/0172963 A1* | 9/2004 | Axe et al. | 62/401 |
| 2005/0051668 A1* | 3/2005 | Atkey et al. | 244/118.5 |
| 2008/0314060 A1* | 12/2008 | Parikh | 62/241 |

FOREIGN PATENT DOCUMENTS

| | | |
|---|---|---|
| WO | 00/37313 A1 | 6/2000 |
| WO | 2007/093389 A1 | 8/2007 |

OTHER PUBLICATIONS

PCT International Search Report and Written Opinion of the International Searching Authority for PCT/US2010/047357, mailed Dec. 3, 2010, 12 pages.

* cited by examiner

SYSTEM AND METHOD FOR IMPROVED COOLING EFFICIENCY OF AN AIRCRAFT DURING BOTH GROUND AND FLIGHT OPERATION

BACKGROUND

1) Field of the Disclosure

The disclosure relates to air conditioning systems, and more particularly, to electrically driven air conditioning systems for aircraft that do not rely on engine and auxiliary power unit (APU) bleed air.

2) Description of Related Art

Known air conditioning systems used in transport aircraft typically use an air-to-air thermodynamic cycle to provide cool air to various interior compartments of the aircraft, such as the passenger cabin, cargo holds, and other interior compartments. During ground operations, such air conditioning systems may operate with the use of electric and pneumatic power from main aircraft engines and/or on-board auxiliary power units (APUs). Air from the compressor stages of the main aircraft engines and/or the on-board APUs, such air also known as "bleed air", may typically be output at a high temperature and a high pressure. Such bleed air may then be cooled and conditioned through air conditioning packs of the air conditioning system. Air conditioning packs may comprise integrated assemblies of air turbines, compressors, fans, heat exchangers, ducts, valves, and other mechanical components. Once the bleed air is conditioned in the air conditioning packs, it may then be distributed into the aircraft interior for aircraft interior temperature control, ventilation, and pressurization. The conditioned air within the aircraft interior may then be discharged to the outside ambient environment through various overboard valves, overflow valves and cabin leaks. However, extracting energy from the main engines and APUs in the form of bleed air can reduce the efficiency of the main engines and APUs and can result in increased fuel consumption and load on the main engines and APUs. Bleed air can require a significant amount of fuel burn where a significant amount of energy can be wasted by the processing of the bleed air.

Other known air conditioning systems for aircraft include electric based air conditioning systems that do not use bleed air. Similar to bleed air based systems, an electric based air conditioning system and its associated power generation and distribution equipment must be sized to accommodate worst case operating conditions, such as a hot weather ground operation. The size and weight of the air conditioning equipment and related power generation and distribution equipment can impact the overall weight of the aircraft and its fuel consumption.

Other known electric based air conditioning systems for aircraft include those disclosed in U.S. Pat. No. 6,526,775 ("Electric Air Conditioning System for an Aircraft") and U.S. Pat. No. 7,207,521 ("Electric-Based Secondary Power System Architectures for Aircraft"). However, such known air conditioning systems draw their air source strictly from the outside ambient environment. As is the case with known air conditioning systems, the size, weight, complexity, and energy usage of the air conditioning system is typically derived from the need to cool and dehumidify warm, humid outside air to a temperature and humidity that meets the cooling needs of the aircraft interior.

Accordingly, there is a need for an aircraft system and method for improved ground cooling efficiency that provides advantages over known systems.

SUMMARY

This need for an aircraft system and method for improved ground cooling efficiency is satisfied. Unlike known systems and methods, embodiments of the novel and nonobvious aircraft system and method for improved ground cooling efficiency of the disclosure may provide one or more of the following advantages: provides an aircraft system and method for improved ground cooling efficiency of an electric based air conditioning system by use of a recovery system which combines as the air conditioning system air source a first volume of cooler, less humid aircraft interior outflow air with a second volume of warm, humid outside aircraft exterior ambient air; provides an aircraft system and method for improved ground cooling efficiency that adds at least one air flow path from the aircraft interior to an air compression device inlet, where the air flow path includes at least one shutoff valve to enable the air flow path during ground operation and to disable the air flow path for flight operation; provides an aircraft system and method for improved ground cooling efficiency and improved cooling performance that enables the reduction of size, weight, and/or power of the air conditioning pack of the air conditioning system; provides an aircraft system and method for improved ground cooling efficiency in which the air conditioning packs and/or the power systems that power the air conditioning packs can be downsized while achieving the same cooling capacity as known air conditioning pack systems, where such downsizing can result in reduced overall weight of the aircraft, reduced assembly complexity, and reduced fuel consumption; provides an aircraft system and method for improved ground cooling efficiency that can improve passenger comfort through improved ground cooling capacity, while providing for reduction in the air conditioning system weight, improved cooling performance, and reduced costs; provides an aircraft system and method for improved ground cooling efficiency that can use known equipment and does not require new or significantly re-designed equipment, thus resulting in reduced costs; provides an aircraft system and method for improved ground cooling efficiency that can reuse and recirculate aircraft interior outflow air into the air compression device inlet of the air conditioning system, thereby reducing the total energy or work needed to reduce the temperature and cool the aircraft interior outflow air going back into the aircraft interior, provides an aircraft system and method for improved ground cooling efficiency that does not rely on main aircraft engine or APU bleed air for operation; and, provides an aircraft system and method for improved ground cooling efficiency that manages air flow during aircraft ground operations so as to maintain the aircraft's interior thermal environment ensuring waste heat from primarily equipment cooling systems is exhausted overboard along with additional aircraft interior exhaust air flow which may contain odors such as from the lavatory, galley ventilation air, nitrogen generation, or other systems.

In an embodiment of the disclosure, there is provided an aircraft system for improved cooling efficiency. The system comprises at least one air conditioning pack coupled to an aircraft. The air conditioning pack has at least one air compression device powered by at least one power source. The air compression device has an air compression device inlet. The system further comprises at least one air flow path for redirecting a first portion of a first volume of aircraft interior outflow air from an aircraft interior to the air compression device inlet. The air flow path includes a shutoff valve to enable the air flow path during ground operation of the aircraft and to disable the air flow path for flight operation of the aircraft. The air compression inlet mixes the first volume of aircraft interior outflow air with a second volume of aircraft exterior inflow air to form an air mixture. The air conditioning pack conditions and circulates the air mixture into the aircraft interior.

In another embodiment of the disclosure, there is provided an aircraft system for improved ground cooling efficiency. The aircraft system comprises an electric based air conditioning system coupled to an aircraft. The air conditioning system comprises at least one air conditioning pack having an air conditioning pack inlet and an air conditioning pack outlet. The air conditioning system further comprises at least one air compressor that provides air to the air conditioning pack, the air compressor having an air compressor inlet and an air compressor outlet. The air conditioning system further comprises at least one electric power source that provides electric power to the air compressor. The aircraft system further comprises an aircraft interior air recovery system coupled to the air conditioning system. The aircraft interior air recovery system comprises at least one air flow path for redirecting a first portion of a first volume of aircraft interior outflow air from an aircraft interior to the air compressor inlet. The aircraft interior recovery system further comprises a shutoff valve coupled to the air flow path to enable the air flow path during ground operation of the aircraft and to disable the air flow path for flight operation of the aircraft. The aircraft system further comprises an aircraft interior air outflow valve coupled to the aircraft interior for directing a second portion of the first volume of aircraft interior outflow air out of the aircraft. The aircraft system further comprises a valve control switch in an aircraft flight deck for enabling and disabling the shutoff valve. The air compression inlet mixes the first volume of aircraft interior outflow air with a second volume of aircraft exterior inflow air to form an air mixture. The air conditioning pack conditions and circulates the air mixture into the aircraft interior.

In another embodiment of the disclosure, there is provided a method for improving cooling efficiency in an aircraft. The method comprises directing via an air flow path a first portion of a first volume of aircraft interior outflow air from an aircraft interior to an air compression device inlet of an air conditioning pack coupled to the aircraft. The method further comprises taking in a second volume of aircraft exterior inflow air from outside the aircraft into the air compression device inlet. The method further comprises mixing in the air compression device inlet the first portion of the first volume of aircraft interior outflow air with the second volume of aircraft exterior inflow air to form an air mixture. The method further comprises conditioning and circulating the air mixture with the air conditioning pack into the aircraft interior.

In another embodiment of the disclosure, there is provided a method for improving ground cooling efficiency in an aircraft. The method comprises directing via at least one air flow path a first portion of a first volume of aircraft interior outflow air from an aircraft interior to an air compression device inlet of an air conditioning pack coupled to the aircraft. The air conditioning pack comprises at least one air compression device powered by at least one power source. The method further comprises directing a second portion of the first volume of aircraft interior outflow air from the aircraft interior to outside of the aircraft. The method further comprise taking in a second volume of aircraft exterior inflow air from outside the aircraft into the air compression device inlet. The method further comprises mixing in the air compressor inlet the first portion of the first volume of aircraft interior outflow air with the second volume of aircraft exterior inflow air to form an air mixture. The method further comprises conditioning and circulating the air mixture with the air conditioning pack into the aircraft interior. The method further comprises coupling a shutoff valve to the air flow path to enable the air flow path during ground operation and disable the air flow path for flight operation. The method further comprises providing a valve control switch in an aircraft flight deck to enable or disable operation of the shutoff valve.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Figure 1:
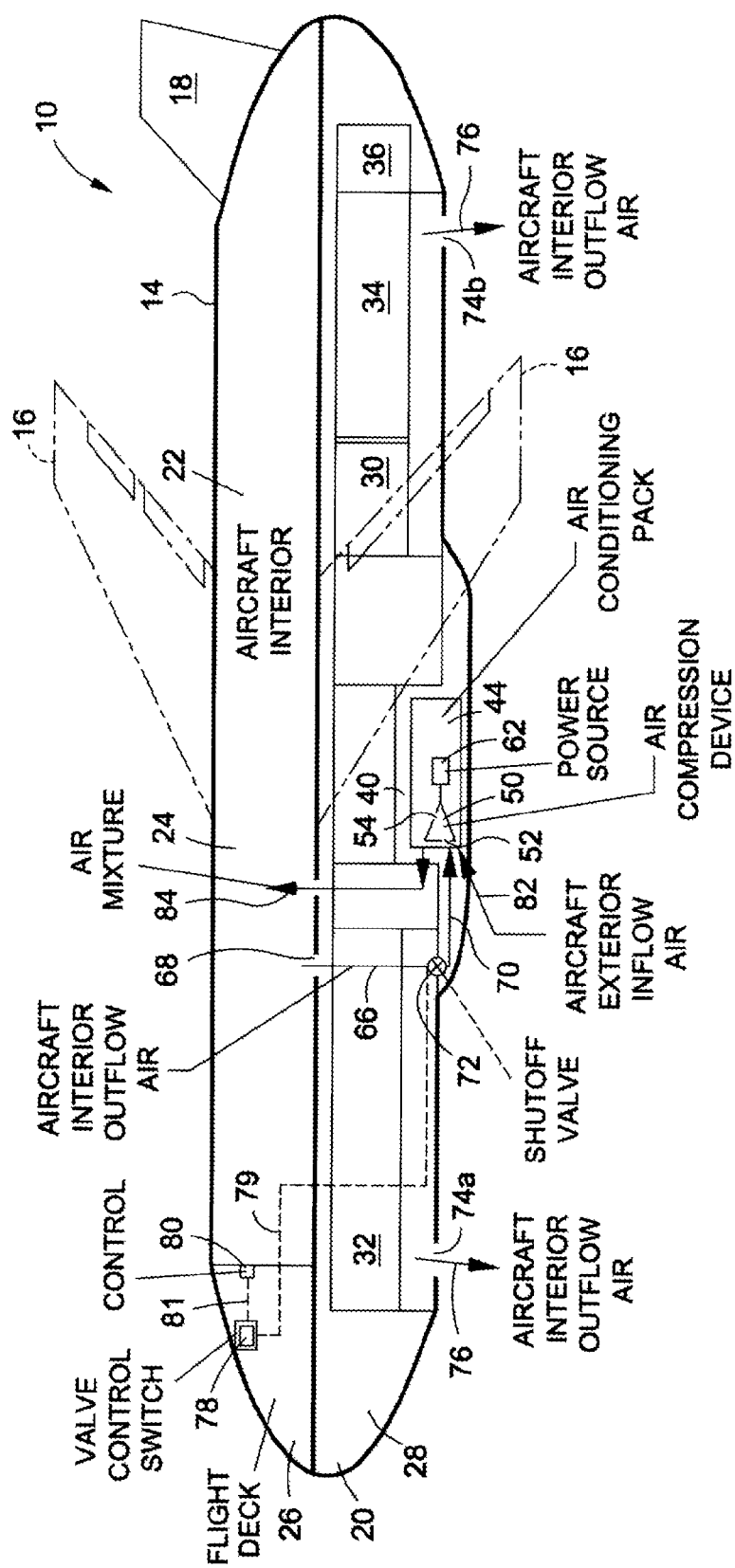
FIG. 1 is an illustration of an aircraft having an embodiment of the aircraft system for improved ground cooling efficiency of the disclosure.
Figure 2:
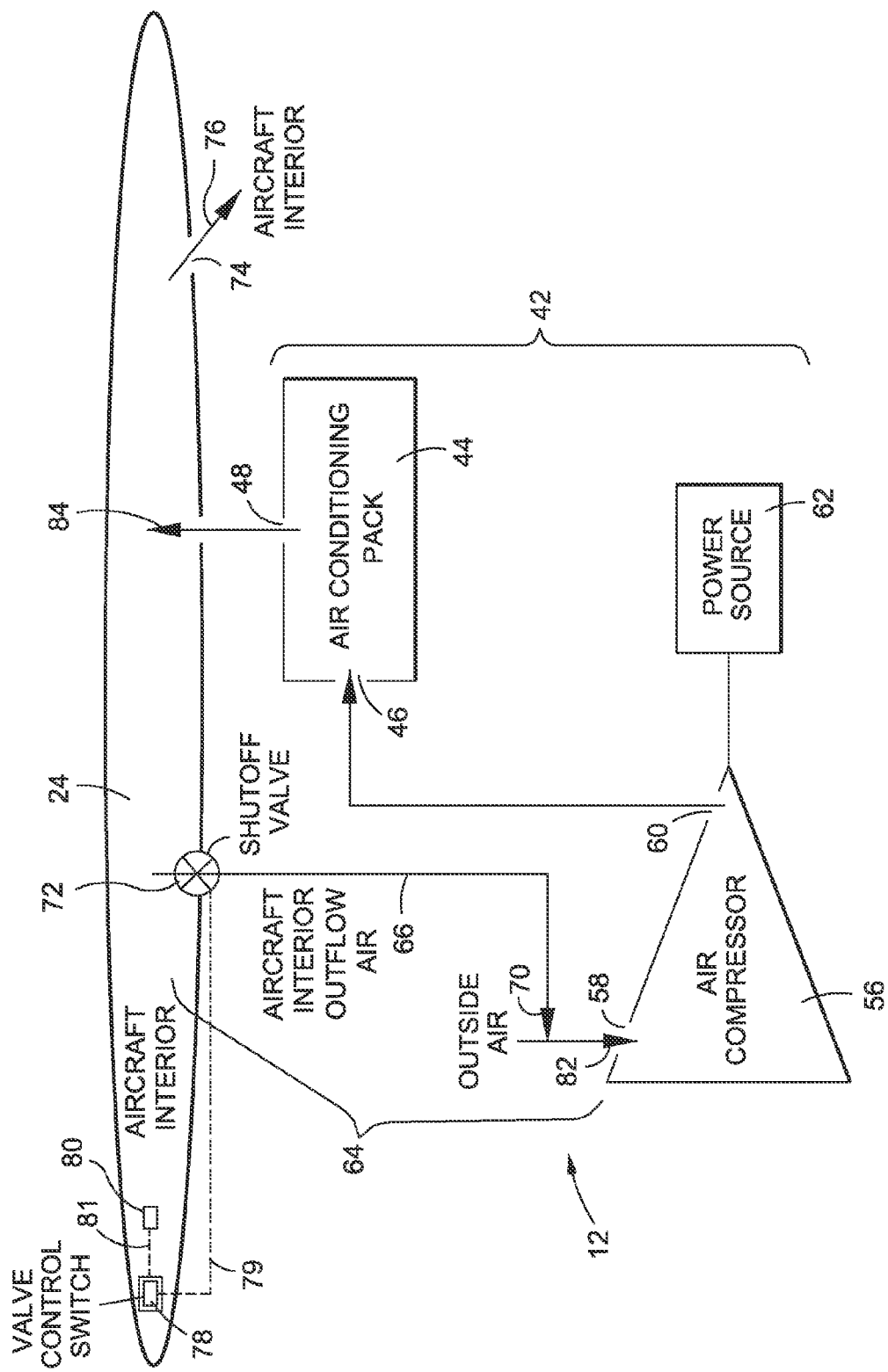
FIG. 2 is an illustration of schematic diagram of an embodiment of the aircraft system for improved ground cooling efficiency of the disclosure; and, FIG. 3 is an illustration of a flow diagram of an embodiment of a method of for improving ground cooling efficiency in an aircraft of the disclosure.

Referring more particularly to the drawings, FIG. 1 is an illustration of an aircraft 10 having an embodiment of an aircraft system 12 for improved ground cooling efficiency. FIG. 2 is an illustration of schematic diagram of an embodiment of the aircraft system 12 for improved ground cooling efficiency of the disclosure. As shown in FIG. 1, the aircraft 10 may comprise a fuselage 14, a pair of wings 16, a tail 18, and a nose 20. The fuselage 14 defines an aircraft interior 22. The aircraft interior 22 may comprise a cabin 24 preferably for passengers, a flight deck 26 preferably for pilots or other flight crew members, a forward electrical equipment bay 28, an aft electrical equipment bay 30, a forward cargo compartment 32, an aft cargo compartment 34, a bulk cargo compartment 36, and/or other suitable compartments or areas. The aircraft system 12 for improved ground cooling efficiency is preferably applicable to ground operation when the cabin 24 is not pressurized. The aircraft 10 may further comprise a wheel well 38. The aircraft 10 may further comprise at least one pack bay 40 which may be in an unpressurized area. There may be two pack bays 40 with one pack bay 40 positioned beneath each wing 16. However, the pack bays 40 may also be located in another suitable area of the aircraft 10. The aircraft system 12 comprises an air conditioning system 42 coupled to the aircraft 10. The air conditioning system 42 is preferably electric based, as opposed to an air conditioning system sourced by main aircraft engine bleed air or auxiliary power unit (APU) bleed air. The aircraft system 12 air conditioning system 42 comprises at least one air conditioning pack 44 coupled to the aircraft 10. The air conditioning pack 44 may be located in the pack bay 40 of the aircraft 10 beneath the wing 18. However, the air conditioning pack 44 may also be located in other suitable areas of the aircraft 10. The air conditioning pack 44 has an air conditioning pack inlet 46 and an air conditioning pack outlet 48. The air conditioning pack 44 comprises at least one air compression device 50 that provides air to the air conditioning pack 44. Preferably, the air conditioning pack 44 is electric based and derives its air source from the air compression device 50. The air compression device 50 preferably has an air compression device inlet 52 and an air compression device outlet 54. Preferably, the air compression device 50 is in the form of an air compressor 56 having an air compressor inlet 58 and an air compressor outlet 60. More preferably, the aircraft 10 comprises an electric based air compressor driven air conditioning system having air compressor inlet 58. The air compression device 50 may also be in the form of other suitable air compression devices. The air conditioning pack 44 of the aircraft system 12 air conditioning system 42 further comprises at least one power source 62 that provides power to the air compression device 50. The power source 62 that drives the air compression device 50 may comprise electric power, hydraulic power, pneumatic power, shaft power, or another suitable power system. The air conditioning pack 44 may further comprise integrated assemblies of air turbines (not shown), fans (not shown), heat exchangers (not shown), and other mechanical components known in the art. The air conditioning pack 44 is configured to provide conditioned air to the cabin 24 to meet temperature, pressure, and air conditioning needs.

Also referring to FIG. 2, the aircraft system 12 further comprises an aircraft interior air recovery system 64 coupled to the air conditioning system 42. The aircraft interior air recovery system 64 of the aircraft 10 comprises at least one air flow path 66 that couples or connects the aircraft interior 22, preferably the cabin 24, to the air compression device inlet 52, preferably the air compressor inlet 58. The air flow path 66 redirects a first portion 68 of a first volume of aircraft interior outflow air 70, or exhaust air, from the cabin 24 of the aircraft interior 22 to the air compression device inlet 52. The aircraft interior recovery system 64 of the aircraft 10 further comprises at least one shutoff valve 72 coupled to the air flow path 66 to enable the air flow path 66 during ground operation of the aircraft 10 and to disable the air flow path 66 for flight operation of the aircraft 10. The shutoff valve 72 is preferably open during ground operation of the aircraft 10 and is preferably closed during flight of the aircraft 10. The aircraft system 12 further comprises at least one aircraft interior air outflow valve 74 coupled to the aircraft interior 22 for directing a second portion 76 of the first volume of aircraft interior outflow air 70 out of the aircraft 10. For example, as shown in FIG. 1, aircraft interior air outflow valve 74a may be located in the forward cargo compartment 32, and aircraft interior air outflow valve 74b may be located in the aft cargo compartment 34. The aircraft system 12 may further comprise a valve control switch 78 that may be located in the flight deck 26. The valve control switch 78 may be used for enabling and disabling the shutoff valve 72 and may be connected to the shutoff valve 72 via one or more connection lines 79. The valve control switch 78 is preferably pilot operated by a pilot in the flight deck 26 and allows the aircraft interior recovery system 64 to be disabled. The valve control switch 78 can be used to ensure compliance with the regulatory requirements of 14 C.F.R. Part 25.831(a). The aircraft system 12 may further comprise a control unit 80 for controlling the shutoff valve 72 in response to selections of the valve control switch 78. The control unit 80 may also be located in the flight deck 26 or in another suitable location in the aircraft 10. The control unit 80 may be connected to the valve control switch 78 via a control line 81. The control unit 80 allows ground cooling mode selection to be enabled or disabled as required for flight operations. The control unit 80 may comprise a computer, a shared centralized control partition, a stand alone control device, an analog, a hardwire, relay logic, or another suitable control unit. The air compression device inlet 52, preferably the air compressor inlet 58, mixes the first volume of aircraft interior outflow air 70 with a second volume of aircraft exterior inflow air 82 to form an air mixture 84. The air conditioning pack 44 circulates the air mixture 84 into the cabin 24 of the aircraft interior 22. The air mixture 84 may comprise a ratio of aircraft exterior inflow air 82 to aircraft interior outflow air 70 in a range of from about 80%/20%, respectively, to about 50%/50%, respectively. Preferably, the air mixture 84 comprises a ratio of about 70% aircraft exterior inflow air 82 and about 30% aircraft interior outflow air 70. However, the ratio of aircraft exterior inflow air to aircraft interior outflow air may be another suitable ratio, as long as other performance considerations are met, such as aircraft air quality, equipment thermal limitations, maintaining a predetermined humidity level, or another suitable performance consideration. Additionally, it may be important to exhaust overboard air flow which may contain odors, such as lavatory and galley ventilation air.

Figure 3:
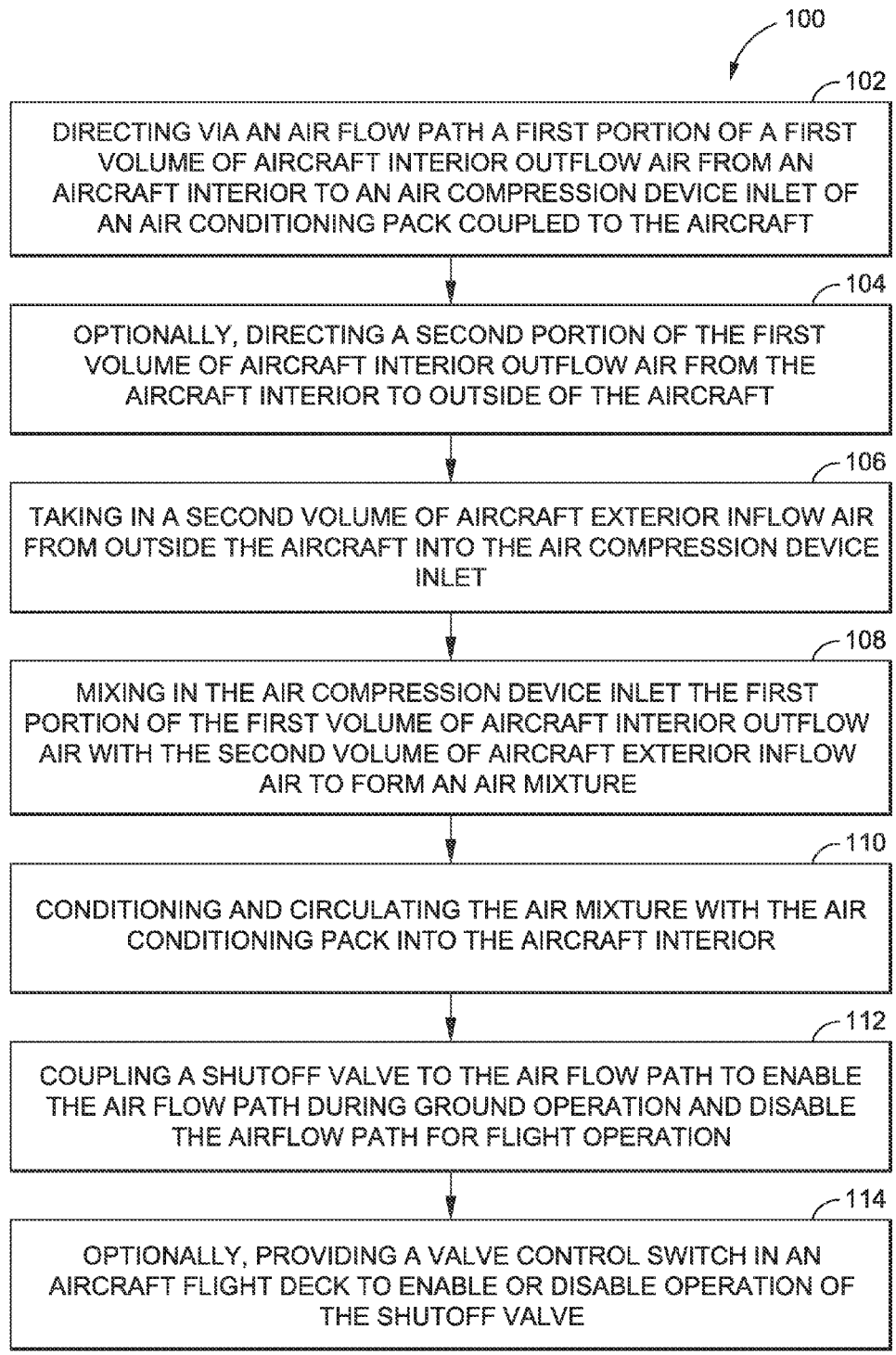

In another embodiment of the disclosure, there is provided a method 100 for improving ground cooling efficiency in an aircraft 10. FIG. 3 is an illustration of a flow diagram of the steps of an embodiment of the method 100 for improving ground cooling efficiency in aircraft 10 of the disclosure. The method 100 comprises step 102 of directing via at least one air flow path 66 (see FIG. 2) a first portion 68 of a first volume of aircraft interior outflow air 70 from the aircraft interior 22, preferably the cabin 24, to the air compression device inlet 52 of at least one air conditioning pack 44 coupled to the aircraft 10. The air conditioning pack 44 comprises at least one air compression device 50 powered by at least one power source 62 (see FIG. 2). The method 100 further comprises optional step 104 of directing a second portion 76 of the first volume of aircraft interior outflow air 70 from the aircraft interior 22 to outside of the aircraft 10. The method 100 further comprise step 106 of taking in a second volume of aircraft exterior inflow air 82 from outside the aircraft 10 and into the air compression device inlet 52, preferably the air compressor inlet 58. The method 100 further comprises mixing in the air compression device inlet 52, or air compressor inlet 58, the first portion 68 of the first volume of aircraft interior outflow air 70 with the second volume of aircraft exterior inflow air 82 to form an air mixture 84. The method 100 further comprises step 110 of circulating the air mixture 84 with the air conditioning pack 44 into the aircraft interior 22, preferably the cabin 24. The method 100 further comprises step 112 of coupling a shutoff valve 72 to the air flow path 66 to enable the air flow path 66 during ground operation and disable the air flow path 66 for flight operation. The method 100 further comprises optional step 114 of providing a valve control switch 78 in an aircraft flight deck 26 to enable or disable operation of the shutoff valve 72 (see FIG. 1). Thus, cabin air flow is routed from the cabin aircraft interior environment to the air compression device inlet or inlets 52 of the one or more air conditioning packs 44. This cabin air flow is them mixed with air being drawn into the air compression device from the outside ambient air environment. The method 100 enables improved ground cooling efficiency by using a combination of warmer, more humid outside air and cooler, less humid cabin outflow or exhaust air as the inlet source for the air conditioning system. Thus, a portion of the cooler, less humid, cabin outflow, or exhaust air, that would typically have been flowing out an aircraft interior outflow valve is being mixed with outside ambient air, conditioned in the air conditioning pack and recirculated and reused back into the cabin of the aircraft interior. This results in an effective reduction in the air compression device inlet temperature and moisture content. The method 100 improves ground cooling efficiency of the electric based or dedicated air compressor driven air conditioning system through the use of the aircraft interior air recovery system 64 as part of the air conditioning pack 44 to duct or redirect some portion or ratio of the used cool interior air volume from the cabin air mass back into the cabin air compressor inlet stage. This reduces the total internal work or enthalpy change required by the air conditioning system to provide the required cooling to the aircraft interior during ground operation.

In most implementations, it is important to the overall aircraft interior thermal environment to ensure that waste heat from primarily equipment cooling systems is exhausted overboard during ground operation. Additionally, it may be important to exhaust overboard airflow which may contain odors such as from the lavatory and galley ventilation air. In addition, other systems, such as nitrogen generation systems used to reduce fuel tank flammability, may require the usage of aircraft interior outflow air or exhaust air. These considerations must be accounted for in assessing the overall aircraft airflow management during ground operations. The aircraft system 12 of the disclosure adds an additional outflow or airflow path 66 and reduces the net inflow. The net inflows and outflows should preferably be balanced. Therefore, the outflow considerations and the net pack inflow must be accounted for in deriving the allowable outflow to be used at the air conditioning system air compression device inlet 52. The greater the allowable outflow to be routed to the air compression device inlet 52, the greater the cooling efficiency improvement will be achieved. Therefore, the goal is preferably to minimize the required outflows by other aircraft systems. As the air compression device inlet 52 air enthalpy is lowered, the overall air conditioning system air conditioning pack 44 may be reduced in size and complexity while achieving the same cooling capacity as known air conditioning packs. Thus, the air conditioning pack 44 of the disclosed embodiments can achieve improved cooling performance and improved ground cooling efficiency, and/or subsequent reduction of size, weight, and power of the air conditioning pack by use of the aircraft interior air recovery system 64 directed to the air compression device inlet 52. The aircraft system 12 may be used on various aircraft, including but not limited to such aircraft as the 787 aircraft. The aircraft system 12 may use known equipment, as opposed to new or significantly re-designed equipment, and may have increased part commonality with other aircraft models. The exemplary embodiments provide a system and method for the reuse and reinjection of cabin air back into the input of the air conditioning system air compressors thereby reducing the total work or energy needed to reduce input cabin air in temperature, potentially reducing system weight, power usage, and size. Ground cooling efficiency is improved through the redirection of a portion or ratio of the used cool interior air volume from the cabin air mass into the cabin air compressor inlet stage. This reduces the total internal work or enthalpy change required by the air conditioning system to provide the required cooling to the aircraft interior during ground operation.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. An aircraft system for improved cooling efficiency, the system comprising:
   at least one air conditioning pack coupled to a pack bay of an aircraft, the pack bay housing the air conditioning pack and at least one air compression device powered by at least one power source, the at least one air compression device having an air compression device inlet;
   at least one air flow path for redirecting a first portion of aircraft interior outflow air from an aircraft interior to the air compression device via the air compression device inlet, then to the air conditioning pack, and then directly back into the aircraft interior, the air flow path including a shutoff valve to enable the air flow path during ground operation of the aircraft and to disable the air flow path for flight operation of the aircraft; and,
   at least one aircraft interior air outflow valve for directing a second portion of aircraft interior outflow air out of the aircraft.

2. The system of claim 1 further comprising a valve control switch in an aircraft flight deck for enabling and disabling the shutoff valve.

3. The system of claim 2 further comprising a control unit for controlling the shutoff valve in response to selections of the valve control switch.

4. The system of claim 1 wherein the air conditioning pack is electric based and derives its air source from the air compression device.

5. The system of claim 1 wherein the air compression device is an electric air compressor.

6. The system of claim 1 wherein the power source is selected from the group comprising electric power, hydraulic power, pneumatic power, and shaft power.

7. The system of claim 1 wherein the aircraft interior comprises an aircraft cabin.

8. The system of claim 1 wherein the air compression device inlet mixes the first portion of aircraft interior outflow air with aircraft exterior inflow air to form an air mixture, and further wherein the air mixture flows from the at least one air compression device to the air conditioning pack for conditioning, and then directly recirculates back into the aircraft interior.

9. The system of claim 8 wherein the air mixture comprises a ratio of aircraft exterior inflow air to aircraft interior outflow air in a range of from about 80%/20% to about 50%/50%.

10. The system of claim 9 wherein the air mixture comprises a ratio of about 70% aircraft exterior inflow air and about 30% aircraft interior outflow air.

11. An aircraft system for improved ground cooling efficiency, the system comprising:
   an electric based air conditioning system coupled to a pack bay of an aircraft, the air conditioning system comprising:
      at least one air conditioning pack housed in the pack bay and having an air conditioning pack inlet and an air conditioning pack outlet;

at least one air compressor housed in the pack bay and providing air to the air conditioning pack, the air compressor having an air compressor inlet and an air compressor outlet; and, at least one electric power source housed in the pack bay and that provides electric power to the air compressor;

an aircraft interior air recovery system coupled to the air conditioning system, the aircraft interior air recovery system comprising:

at least one air flow path for redirecting a first portion of aircraft interior outflow air from an aircraft interior to the air compressor via the air compression device inlet, then to the air conditioning pack, and then directly back into the aircraft interior; and, a shutoff valve coupled to the air flow path to enable the air flow path during ground operation of the aircraft and to disable the air flow path for flight operation of the aircraft;

an aircraft interior air outflow valve for directing a second portion of the aircraft interior outflow air out of the aircraft; and, a valve control switch in an aircraft flight deck for enabling and disabling the shutoff valve;

wherein the air compression inlet mixes the first portion of aircraft interior outflow air with aircraft exterior inflow air to form an air mixture, and further wherein the air mixture flows from the at least one air compression device to the air conditioning pack for conditioning, and then directly recirculates back into the aircraft interior.

12. The aircraft system of claim 11 wherein the air mixture comprises a ratio of aircraft exterior inflow air to aircraft interior outflow air in a range of from about 80%/20% to about 50%/50%.

13. The aircraft system of claim 12 wherein the air mixture comprises a ratio of about 70% aircraft exterior inflow air and about 30% aircraft interior outflow air.

14. A method for improving cooling efficiency in an aircraft, the method comprising:

housing within a pack bay of the aircraft an air conditioning pack and an air compression device powered by a power source;

directing via an air flow path a first portion of aircraft interior outflow air from an aircraft interior to the air compression device via an air compression device inlet, then to the air conditioning pack, and then directly back into the aircraft interior;

directing a second portion of aircraft interior outflow air from the aircraft interior to outside of the aircraft;

taking in aircraft exterior inflow air from outside the aircraft into the air compression device via the air compression device inlet;

mixing in the air compression device inlet the first portion of aircraft interior outflow air with the aircraft exterior inflow air to form an air mixture;

conditioning the air mixture with the air conditioning pack;

directly recirculating the air mixture back into the aircraft interior; and, coupling a shutoff valve to the air flow path to enable the air flow path during ground operation and disable the air flow path for flight operation.

15. The method of claim 14 further comprising routing cabin air flow from a cabin aircraft interior to the air compression device inlet.

16. The method of claim 14 further comprising reducing a total energy needed to cool the aircraft interior outflow air going back into the aircraft interior.

17. The method of claim 14 further comprising providing a valve control switch in an aircraft flight deck to enable or disable operation of the shutoff valve.

18. The method of claim 14 wherein the air conditioning pack is electric based and derives its air source from an electric air compressor.

19. The method of claim 14 wherein the air mixture comprises a ratio of aircraft exterior inflow air to aircraft interior outflow air in a range of from about 80%/20% to about 50%/50%.

20. A method for improving ground cooling efficiency in an aircraft, the method comprising:

housing within a pack bay of the aircraft an air conditioning pack and an air compression device powered by a power source;

directing via at least one air flow path a first portion of aircraft interior outflow air from an aircraft interior to the air compression device via an air compression device inlet, then to the air conditioning pack, and then directly back into the aircraft interior;

directing a second portion of aircraft interior outflow air from the aircraft interior to outside of the aircraft;

taking in aircraft exterior inflow air from outside the aircraft into the air compression device via the air compression device inlet;

mixing in the air compression device the first portion of the aircraft interior outflow air with the aircraft exterior inflow air to form an air mixture;

conditioning the air mixture with the air conditioning pack;

directly recirculating the air mixture back into the aircraft interior;

coupling a shutoff valve to the air flow path to enable the air flow path during ground operation and disable the air flow path for flight operation; and, providing a valve control switch in an aircraft flight deck to enable or disable operation of the shutoff valve.

21. The method of claim 20 wherein the air mixture comprises a ratio of aircraft exterior inflow air to aircraft interior outflow air in a range of from about 80%/20% to about 50%/50%.

22. The method of claim 20 wherein the power source is selected from the group comprising electric power, hydraulic power, pneumatic power, and shaft power.

* * * * *